United States Patent [19]

Mahler et al.

[11] 4,230,679

[45] Oct. 28, 1980

[54] POLY(SILICIC ACID)

[75] Inventors: Walter Mahler; William O. Forshey, Jr., both of Wilmington, Del.

[73] Assignee: E. I. Du Pont de Nemours and Company, Wilmington, Del.

[21] Appl. No.: 972,423

[22] Filed: Dec. 22, 1978

[51] Int. Cl.$^3$ ............................................. C01B 33/14
[52] U.S. Cl. ..................................... 423/325; 423/335; 423/338; 252/449; 252/451
[58] Field of Search ................ 423/325, 335, 338, 339; 252/449, 451

[56] References Cited

U.S. PATENT DOCUMENTS

| | | |
|---|---|---|
| 2,278,746 | 4/1942 | Sturgeon . |
| 3,079,234 | 2/1963 | Jenkins et al. ........................ 423/338 |
| 3,494,874 | 2/1970 | Flanigen et al. ................. 252/451 X |
| 3,652,214 | 3/1972 | Aboutboul et al. . |
| 3,672,833 | 6/1972 | Teichner et al. ..................... 423/338 |
| 3,681,017 | 8/1972 | Butcher et al. . |
| 3,794,712 | 2/1974 | Aboutboul et al. . |
| 3,819,811 | 6/1974 | Aboutboul et al. ................... 423/338 |
| 3,917,721 | 11/1975 | Frampton . |
| 3,977,993 | 8/1976 | Lynch ............................. 423/338 X |
| 4,006,175 | 2/1977 | Termin et al. ..................... 423/338 X |
| 4,037,042 | 7/1977 | Tamm .............................. 423/338 X |
| 4,039,474 | 8/1977 | Feistel et al. . |
| 4,111,843 | 9/1978 | Feistel et al. . |
| 4,112,032 | 9/1978 | Blaszyk et al. . |
| 4,122,041 | 10/1978 | Mahler ................................ 252/449 |
| 4,148,864 | 4/1979 | Groth et al. ...................... 423/338 X |

FOREIGN PATENT DOCUMENTS 1268122  5/1968 Fed. Rep. of Germany .
2503332  8/1975 Fed. Rep. of Germany .
50-161484 12/1975 Japan .

OTHER PUBLICATIONS

Sharygm et al., "Kinet. Katal. 11," (1), 187, 1970.
Sharygm et al., "Russ, J. Phys. Chem.," 42(8) 1124, (1968).
Ljubaum, "Ber.," 22, 727 (1889).
Lottermoser, "Ber.," 41, 3976 (1908).
Hazel et al., "J. Colloid Sci.," 5, 532 (1950).
Bechtold, "J. Phys. Chem.," 59, 532 (1955).

*Primary Examiner*—Jack Cooper

[57] ABSTRACT

Particulate, porous, water-insoluble amorphous poly(silicic acid) which is characterized by an average pore diameter of at least 100 Å and a surface area of 500 to 850 m$^2$/g, by an average pore diameter of 50 Å to about 300 Å and a surface area of greater than 850 m$^2$/g, or by a pore volume of 1.5 ml/g to about 8.5 ml/g and a surface area of greater than 850 m$^2$/g; process for preparing particulate, porous, water-insoluble, amorphous poly(silicic acid) by acidifying an appropriate aqueous silicate solution, allowing the silicic acid thus formed to polymerize to poly(silicic acid), freezing the acidified solution, and thereafter thawing the acidified solution and isolating therefrom, washing, drying and recovering particulate poly(silicic acid), said process further characterized in that:

(a) the amount of silicate in the aqueous silicate solution is such that the SiO$_2$ content of the acidified solution is about 4 to 25 weight % and such that the acidified solution contains about 15 to 150 weight %, based on the weight of SiO$_2$, of at least one water-soluble compound which is precipitable from the acidified solution at $-10°$ to $-200°$ C. and which is inert to the silicate, silicic acid and poly(silicic acid);

(b) the aqueous silicate solution is acidified to a pH of about 3 to 9; and (c) the acidified solution is cooled to a temperature of about $-10°$ to $-200°$ C. until it is frozen to separate substantially all of the chemically unbound water as substantially pure ice and to precipitate water soluble compound within the pores of the poly(silicic acid) particles being formed.

17 Claims, 4 Drawing Figures

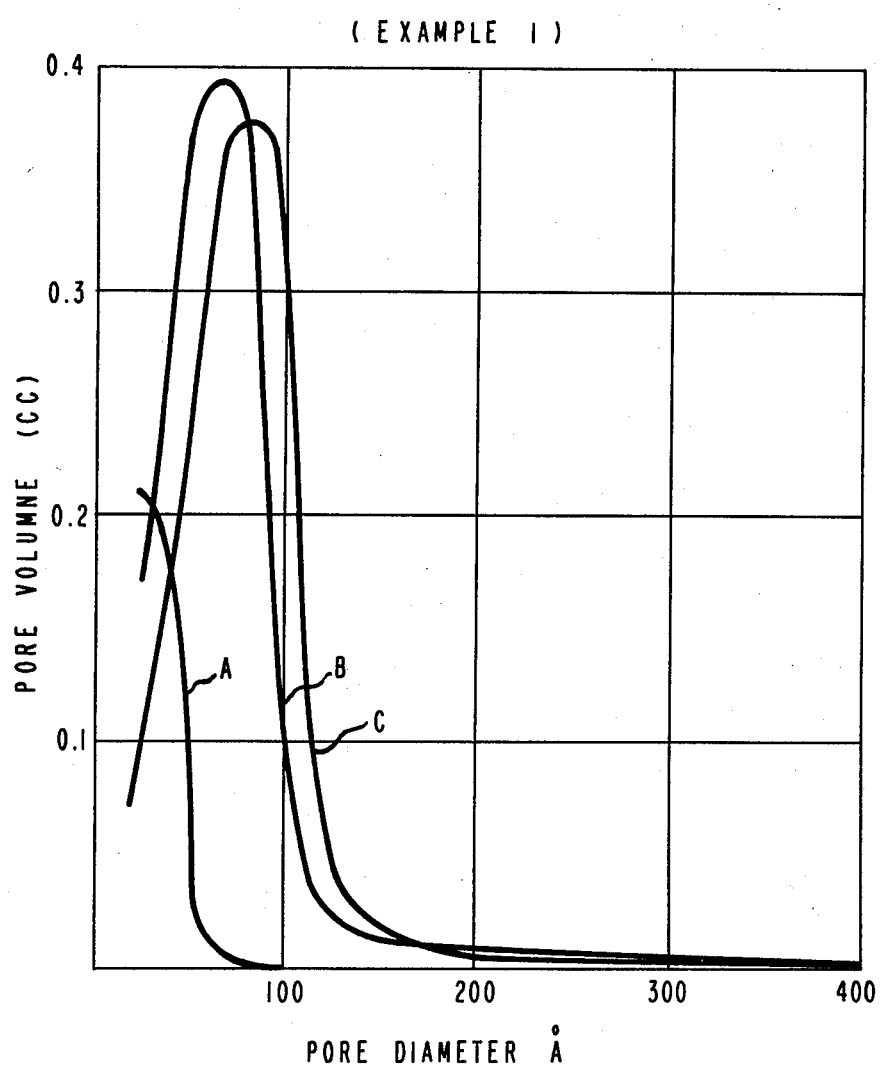
F I G. 1
(EXAMPLE 1)

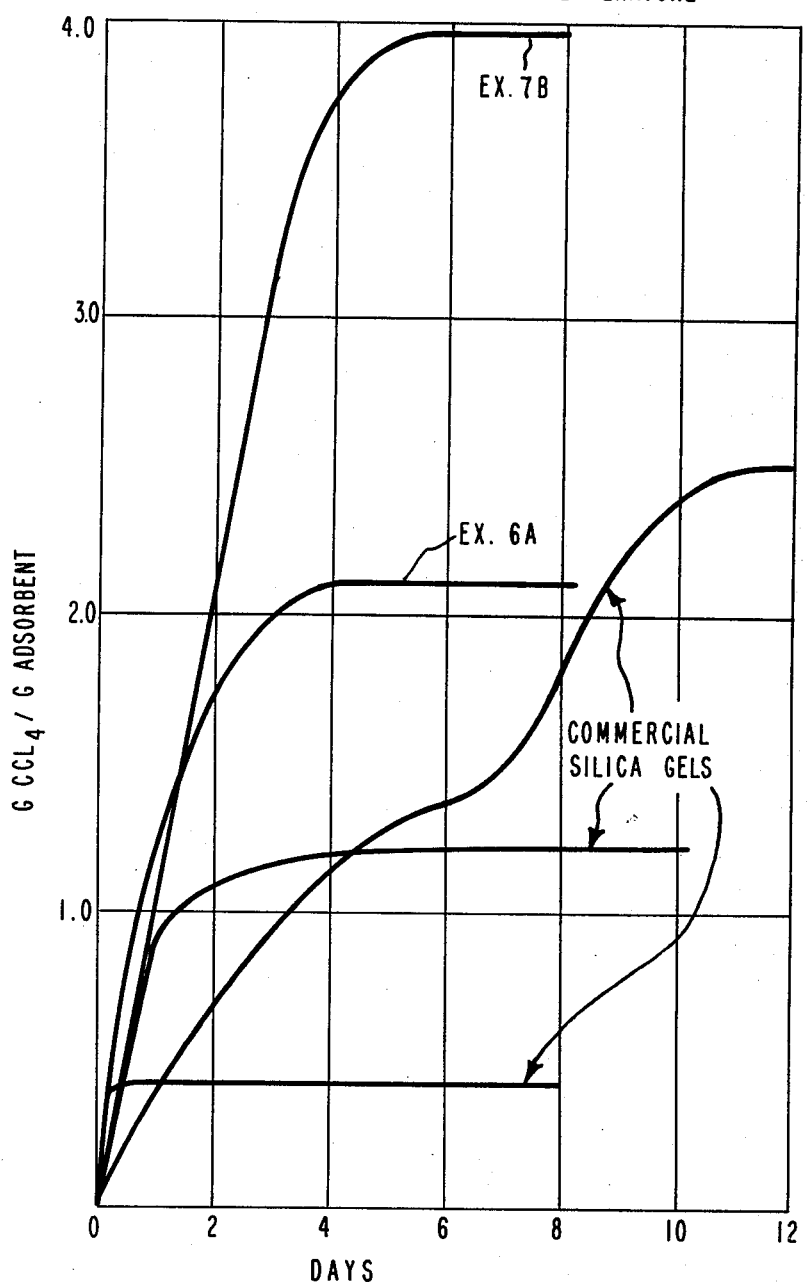

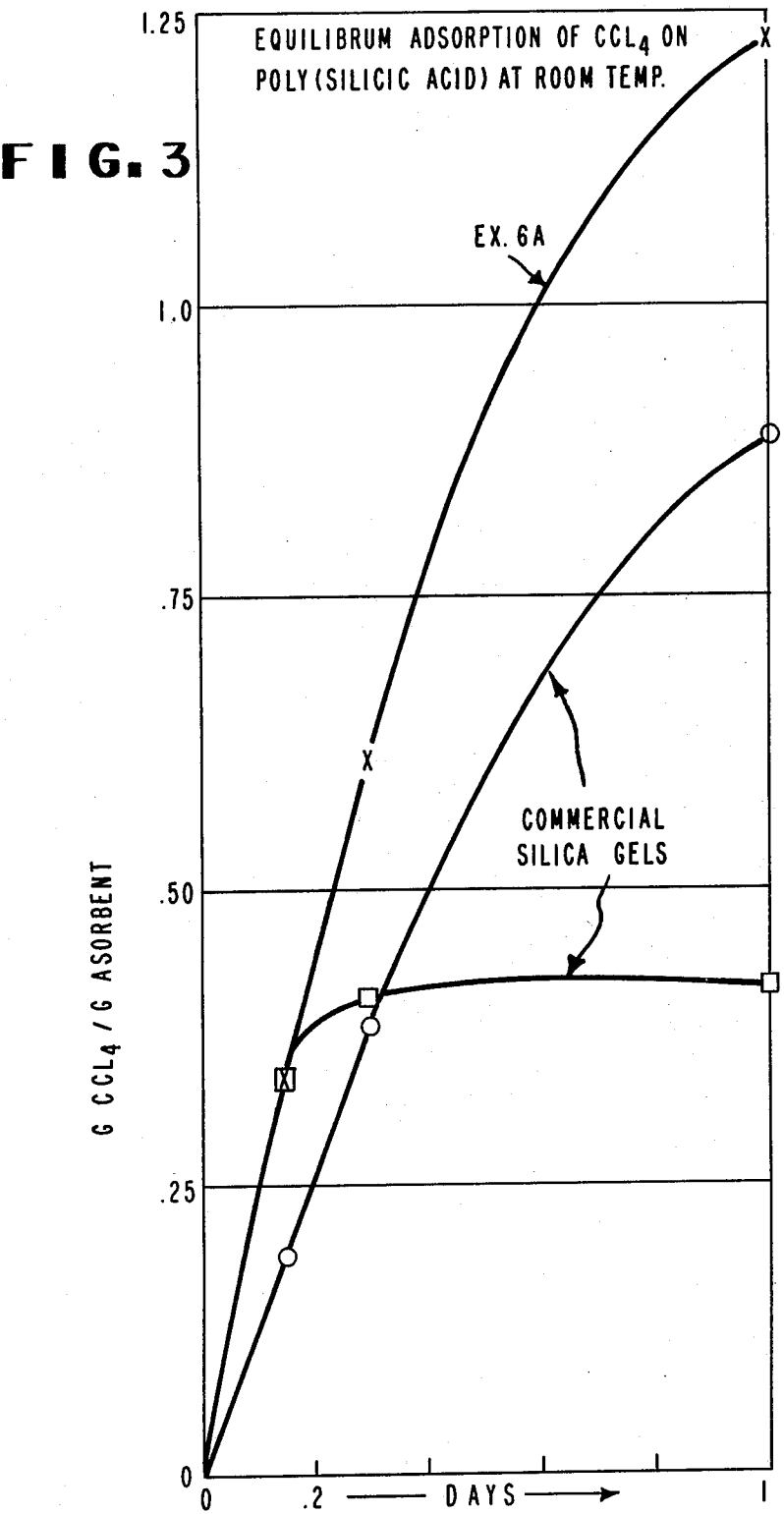

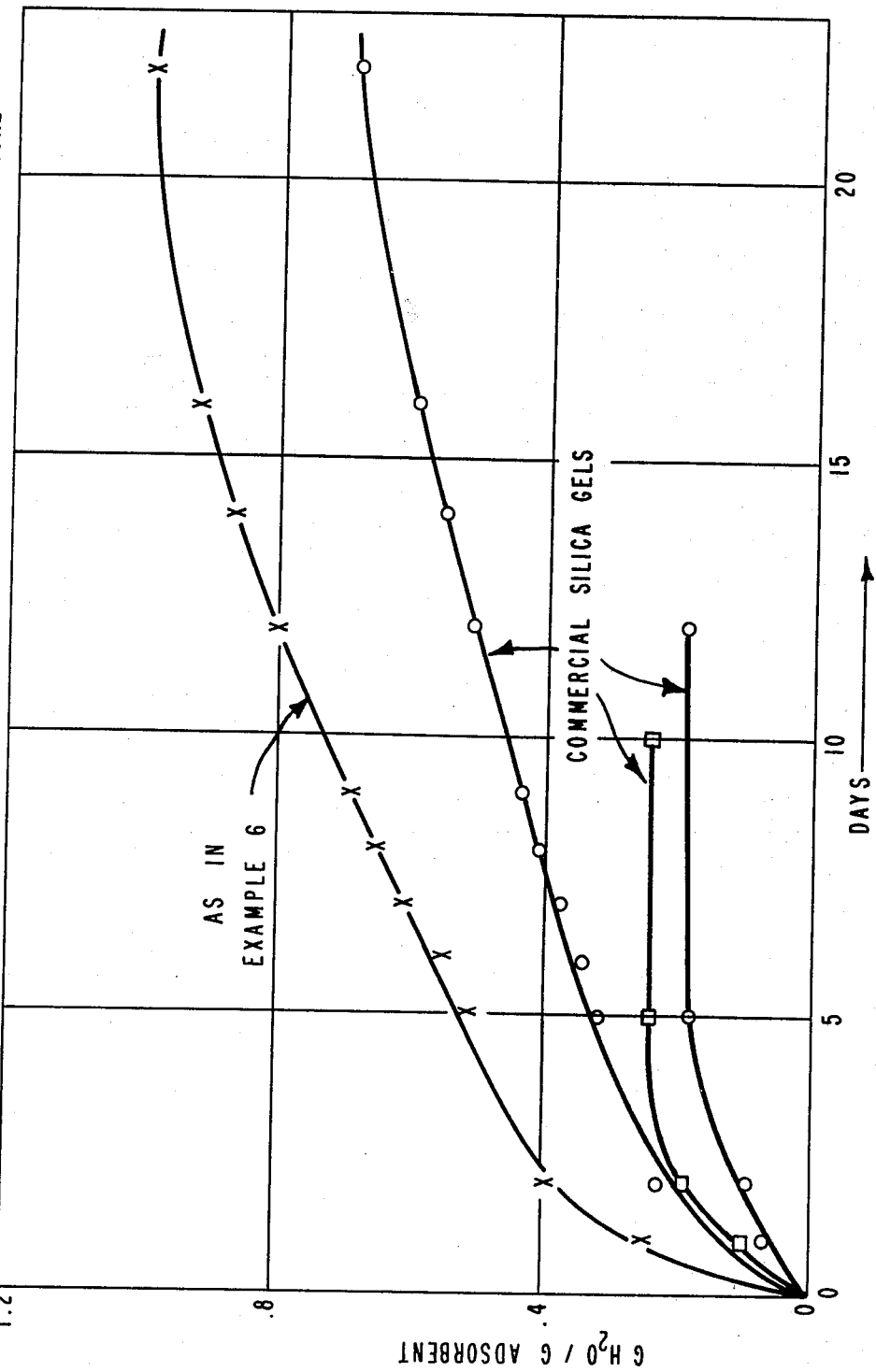

POLY(SILICIC ACID)

DESCRIPTION

1. Technical Field

This invention relates to poly(silicic acid) having an unusual combination of physical and chemical properties.

One object of this invention is to provide a novel poly(silicic acid). Another object is to provide a novel process for preparing such a material. Still another object is to provide a particulate poly(silicic acid) having high porosity, high surface area and a narrow distribution of pore sizes. A further object is to provide a poly(silicic acid) that is useful as a catalyst component and adsorbent.

2. Background Art

The preparation of siliceous particles, from aqueous silicic acid, employing freezing and thawing techniques, is well known in the art. For example, Sharygin et al., Kinet. Katal., 11 (1), 187 (1970); Russ. J. Phys. Chem., 42 (8), 1124 (1968); and Kolloid Zh., 31 (3), 459 (1969), disclose the preparation of porous silicas by mixing aqueous sodium metasilicate and sulfuric acid, cooling and maintaining the mixture at $-2°$ C. until gelation takes place, washing the gel thus formed with water at $0°$ C. to remove electrolytes therefrom, aging the gel at $0°$ to $92°$ C. for 24 hours, freezing the gel at $-6°$ C. for 12 hours, and thereafter thawing the gel and recovering therefrom the siliceous particles. Sharygin et al. further disclose that pore diameters and pore volumes of the siliceous particles so prepared decrease as the gel freezing temperature is decreased. In general, the prior art suggests that soluble inorganic by-products or impurities, such as salts, either should be removed from the gel before it is frozen or should be present in the gel at only low concentration levels.

In the preparation of silica gel useful as a catalyst support component (see, for example, U.S. Pat. No. 4,039,474 and U.S. Pat. No. 2,933,456) by acidifying aqueous sodium silicate with a mineral acid to precipitate silica, followed by washing, drying, extruding and calcining at $593°$ C., it has been found that the addition of excess alkali, as sodium hydroxide or sodium carbonate, to the sodium silicate solution before acidification results in higher pore volume and an increased proportion of larger diameter pores in the product. The gels formed in the process were not frozen.

BRIEF DESCRIPTION OF DRAWINGS

The accompanying drawings form a material part of this disclosure.

FIG. 1 depicts a plot of pore volume and pore diameter for poly(silicic acid) particles of this invention, produced in the presence of varying amounts of ammonium chloride.

FIGS. 2 and 3 depict, respectively, on two different time scales, plots of equilibrium adsorption capacity (EAC) for carbon tetrachloride and time for poly(silicic acids) of this invention and for common commercially available silica gels.

FIG. 4 depicts plots of equilibrium adsorption capacity (EAC) for water and time for poly(silicic acids) of this invention and for common commercially available silica gels.

DISCLOSURE OF INVENTION

For further comprehension of the invention, and of the objects and advantages thereof, reference may be made to the following description and to the appended claims in which the various novel features of the invention are more particularly set forth.

This invention resides in particulate, porous, water-insoluble amorphous poly(silicic acid) which is characterized by an average pore diameter of at least 100 Å and a surface area of 500 to 850 m$^2$/g, preferably 600 to 850 m$^2$/g, or by an average pore diameter of 50 Å to about 300 Å, preferably 60 Å to about 300 Å, and a surface area of greater than 850 m$^2$/g. Such particulate poly(silicic acid) includes that which is characterized by a pore volume of 1.5 ml/g to about 8.5 ml/g, preferably 1.8 ml/g, more preferably 2.0 ml/g, to about 8.5 ml/g and a surface area of greater than 850 m$^2$/g. The invention also resides in the process for preparing particulate, porous, water-insoluble, amorphous poly(silicic acid) by acidifying an appropriate aqueous silicate solution, allowing the silicia acid thus formed to polymerize to poly(silicic acid), freezing the acidified solution, and thereafter thawing the acidified solution and isolating therefrom, washing, drying and recovering particulate poly(silicic acid), said process further characterized in that:

(a) the amount of silicate in the aqueous silicate solution is such that the SiO$_2$ content of the acidified solution is about 4 to 25 weight % and such that the acidified solution contains about 15 to 150 weight %, based on the weight of SiO$_2$, of at least one water-soluble compound which is precipitable from the acidified solution at $-10°$ to $-200°$ C. and which is inert to the silicate, silicic acid and poly(silicic acid);

(b) the aqueous silicate solution is acidified to a pH of about 3 to 9, preferably about 4 to 7, more preferably about 6 to 6.5;

(c) optionally, but preferably, the acidified solution is aged, at least until a gel is formed, preferably for no longer than 24 hours, more preferably 4 minutes to four hours, at room temperature; and (d) the acidified solution is cooled to a temperature of about $-10°$ to $-200°$ C. until it is frozen to separate substantially all of the chemically unbound water as substantially pure ice and to precipitate water soluble compound within the pores of the poly(silicic acid) particles being formed.

The poly(silicic acid) particles of this invention, although extremely porous, are nevertheless remarkably thermally stable, retaining over 95% of their surface area and pore volume after being heated in air for 72 hours at $800°$ C. (Example 1). The poly(silicic acid) particles of this invention are of the empirical formula

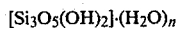

[Si$_3$O$_5$(OH)$_2$]·(H$_2$O)$_n$ wherein n is a fractional or whole number within the range about 0 to 6. Freshly formed particles before drying, wherein, in the above formula, n may be about 6, contain about 62.5% wt % SiO$_2$. Particles dried to constant weight at about $125°$ to somewhat less than $300°$ C., wherein, in the above formula, n approaches 1, contain about 91% SiO$_2$. The siliceous particles may be dehydrated at about $300°$ C. until n in the above formula is 0. Dehydration above about $300°$ C. leads to loss of water from [Si$_3$O$_5$(OH)$_2$]. Compositions corresponding to the above formula wherein n is about 1 to 2 are most preferred; those wherein n is about 0.5 to 1 are next most preferred.

The aqueous silicate starting material should have an $SiO_2$ content of about 5 to 30%, by weight, preferably about 5 to 25%. The at least one water-soluble compound which must be present in and uniformly distributed throughout the acidified silicate solution, at the concentration level of about 15 to 150%, by weight, of the $SiO_2$ present, preferably about 20 to 120%, is a water-soluble compound which is precipitable from the solution during cooling thereof to $-10°$ to $-200°$ C., is chemically inert to the silicic acid environment, and does not interfere significantly with the polymerization process. Such a soluble compound can be selected from: (i) salts of alkali and alkaline earth metal, ammonium and quaternary ammonium cations and anions of mineral acids, such as sulfuric, nitric, hydrochloric and phosphoric acids, or organic acids, such as formic, acetic, oxalic, citric and thiocyanic acids; and (ii) alkaline or neutral, water-soluble organic compounds. The above list is intended to be representative, not by any means all inclusive or exclusive. Examples of (i) include $Na_2SO_4$, NaCl, $(NH_4)_2HPO_4$, $CH_3CO_2NH_4$, LiCl, $NaNO_3$, $NH_4NO_3$, $CH_3CO_2Na$, $HCO_2Na$, $Na_2C_2O_4$, $CaCl_2$, $Ca(SCN)_2 \cdot 4H_2O$; examples of (ii) include ethanolamine, triethanolamine, morpholine, sorbitol and sucrose.

The water-soluble precipitable additive (or additives) can be introduced during the preparation of fresh aqueous silicic acid solution. The aqueous silicic acid solution can be prepared either by dissolving an alkali metal silicate in water or, preferably, by diluting a commercially available concentrated aqueous solution of sodium silicate with water to the desired strength, and acidifying the aqueous solution.

In one preferred embodiment, aqueous sodium silicate solution is passed through an ion-exchange column packed with a cation exchange resin in its hydrogen form, the column being of sufficient volume that the $Na^+$ ions of the solution are completely exchanged during passage of the solution through the column. A suitable laboratory column is 61 cm long and 7.6 cm in diameter. By sodium silicate is meant the compound of the approximate formula $Na_2O \cdot (SiO_2)_x$ wherein x, the $SiO_2/Na_2O$ ratio, is such that the compound dissolves in water sufficiently to permit preparation of solutions wherein the $SiO_2$ content is about 5 to 30%, by weight; this requirement is met by, but not limited to, commercial sodium silicate products in which x is in the range 1 to 4. Operable sodium silicate may have x of at least 10 (Example 15). Aqueous sodium silicate solutions, before acidification, exhibit a pH of at least 10. Commercially available sulfonated polystyrene copolymers are suitable as cation exchange resins. To the freshly-generated silicic acid solution exiting the column can be added a requisite water-soluble compound. The pH of the aqueous solution is then adjusted to about 3 to 9, preferably about 4 to 7, more preferably about 6 to 6.5, by the addition of a base, for example, dilute aqueous ammonium hydroxide (Example 1).

Alternatively, an aqueous acid, such as hydrochloric, sulfuric, nitric or acetic acid, optionally containing a water-soluble chemical compound dissolved therein, can be added to the alkaline sodium silicate solution until the desired pH is reached. Acidification must be conducted carefully, with stirring, to avoid silica precipitation. Such a neutralization reaction forms in situ a salt, e.g., $Na_2SO_4$, which serves as a requisite water-soluble compound, either alone or in combination with one or more added water-soluble compounds (Examples 4, 6, 10 and 12).

In still another embodiment, the ion-exchange method described above can be modified, using known techniques, so that the cation exchange resin is in its $NH_4^+$ form, e.g., as in the method disclosed in U.S. Pat. No. 3,681,007. The effluent is, in this embodiment, principally aqueous ammonium silicate solution, which may require acidification, e.g. with a mineral acid, preferably hydrochloric acid, or $CO_2$, to the desired pH, with the concomitant production of $NH_4Cl$ or $(NH_4)_2CO_3$, particularly desirable solutes.

It is generally recognized in the art that the silicic acid in a freshly prepared silicic acid solution is not monomeric, but is polymeric, having a number average molecular weight in the range about 500 to 1500. The molecular weight of the thus-formed poly(silicic acid) increases with time, through condensation of hydroxyl groups, whereby water is eliminated from the structure of the polymer, and, eventually, gelation occurs. The molecular weight of the poly(silicic acid) continues to increase in the gel, probably by cross-linking of the polymer chains. The molecular weight and cross-linking of the poly(silicic acid) can be controlled by a number of variables, such as the concentration and pH of the silicate solution, time and temperature. The rate of polymerization is highest at a pH of about 4.5 to 6.5. A pH in the range of about 3 to 9 is useful. A pH of about 4 to 7 is preferred; 6 to 6.5 is still more preferred.

Gelation of the poly(silicic acid) solution indicates that the poly(silicic acid) is polymerized beyond the minimum degree required for isolation of insoluble porous particles thereof on freezing and thawing of the acidified solution. Optionally, but preferably, the poly(silicic acid) solution is allowed to gel before being frozen. The time required for a poly(silicic acid) solution to gel varies with $SiO_2$ concentration, pH of the solution and temperature; gel time can be less than 30 minutes, in some cases, less than 10 seconds.

It is important that all the requisite materials, including any soluble additive, mineral acid and sodium silicate, be well and rapidly mixed together for maximum uniformity. This is especially so when gelation times are short. One convenient technique is to employ a mixing nozzle, for example, a multiple-jet mixing nozzle, similar to those described by A. Weissberger, "Techniques of Organic Chemistry", Vol. VIII, Part II (Interscience, 1963), p. 709, to ensure complete and rapid mixing.

In preparing the poly(silicic acid) particles of this invention, it has been found beneficial, though not essential, to the stability of the final poly(silicic acid) structure to allow freshly-formed gel to mature (age) at room temperature for a period of up to about 24 hours, preferably 4 minutes to 4 hours, most preferably 5 to 30 minutes, prior to freezing of the gel. During aging, the gel can be allowed to remain quiescent or it can be granulated mechanically to render it more manageable in subsequent processing steps.

The acidified solution, containing poly(silicic acid), preferably gelled and aged and in granulated form, is cooled to a temperature of about $-10°$ to $-200°$ C., preferably about $-15°$ to $-80°$ C., until it has completely solidified. One convenient procedure for freezing gel is to pour gel granules directly into a liquid refrigerant, such as Freon ® 113 Refrigerant, maintained at the freezing temperature. This method facilitates rapid transfer of heat from the gel, which thus quickly reaches the refrigerant temperature. In a preferred embodiment of the invention, a well-mixed silicate solution, containing water-soluble additives, is allowed to age for up to about 4 hours, conveyed to a granulating device, granulated to approximately 3.175 mm particles and discharged into a fluorocarbon refrigerant maintained at $-25°$ C. Gel granules can be frozen sequentially at such a rate that the product exiting from the mixing nozzle has aged for about 1 minute to about 24 hours, preferably about 4 minutes to about 4 hours, prior to freezing.

The physical and chemical mechanisms which operate during cooling of the acidified solution, usually in the form of a gel, are substantially completed when it is completely frozen. Frozen solutions can be stored for any length of time; storage times of about two hours have been found convenient.

Although it is in no way intended to characterize the process of this invention by any particular mechanism, it is believed that a major factor contributing to the establishment of large pores, and a high surface area, in the product of this invention is the separation from the acidified solution, during freezing, of relatively pure ice crystals which progressively compress the poly(silicic acid) structure. As ice separation continues, dissolved solute begins to precipitate within the structure as the concentration of the solute increases in the decreasing amount of liquid water. This process continues until all but the chemically bound water has separated from the poly(silicic acid) as ice, the highly compressed poly(silicic acid) has fragmented into particles or flakes and substantially all dissolved solute has precipitated within the pores of the poly(silicic acid) particles. As the poly(silicic acid) concentration increases, its degree of polymerization also increases. The precipitation of solute within the pores of the poly(silicic acid) particles is believed to be critical to the development and maintenance of a stable network of relatively large pores, which might otherwise collapse, partially or completely, under the forces imposed by ice crystallization. The effects of freezing and of increasing solute concentration on the porosity of the final siliceous particles are dramatic. Moreover, the distribution of pore sizes present in the siliceous particles of this invention is surprisingly narrow (FIG. 1 and Example 1).

The frozen acidified solution can be removed from the freezing bath, allowed to thaw, either in air or in water at room temperature, and the particulate poly(silicic acid) separated therefrom by filtration. The product usually is washed with water to remove soluble materials, including solutes which may have been added. The removal of soluble materials from the poly(silicic acid) particles is essential because of their possible adverse effect on the thermal stability of the particles during elevated temperature usage. The poly(silicic acid) of the invention is commonly used at temperatures as high as 600° C.

The aforesaid thawed particles can be washed free of soluble materials, as already indicated, with water, preferably deionized water, or with deionized water followed by washes with dilute mineral acid, preferably sulfuric acid or nitric acid. Mineral acid washes can again be followed by water washes until the filtrate is free of the acid anions, e.g. $SO_4^=$ or $NO_3^-$. Washing of particles using well-known countercurrent techniques and equipment, such as disclosed in U.S. Pat. No. 3,881,876, provides a particularly effective means for removing soluble materials. The product obtained upon thawing the frozen acidified solution can be passed as a slurry, containing about 10 to 40 wt % solids, downward through the washing column. Simultaneously, deionized water can be slowly passed, countercurrent to the solids flow, upwards through the column, being introduced just below the bottom or exit plate in, e.g. a twenty-plate column. To facilitate removal of metal ions from the particles, a dilute aqueous acid, preferably sulfuric acid or nitric acid, can be introduced about five plates above the exit plate. The siliceous particles are thus washed by a countercurrent flow of dilute acid for the upper fifteen column plates and by a countercurrent flow of deionized water in the final five plates, to remove the final traces of dissolved salts and dilute acid anions.

Sharygin et al., supra, disclose that the capillary forces resulting from the surface tension of liquid water in contact with the internal surfaces of water-wet siliceous particles prepared by a freezing process can be sufficient to cause partial collapse of the porous structure during water removal in the final drying step. They further disclose that the displacement of water from siliceous particles with a water-soluble organic liquid, such as ethanol or diethyl ether, having a low surface tension, followed by vaporization of the liquid at or above its critical temperature, substantially preserves the porous structure of the particles, but that removal of such organic liquids at sub-critical temperatures, for example, 115° C., actually reduces porosity and pore volume.

In the preferred washing procedure of the present invention process, the final water wash is followed by washing with a water-soluble organic liquid; acetone is especially preferred. The washed particles are finally dried at a temperature of about 105° to 200° C., preferably at 115° to 150° C. Although such a temperature is substantially below the critical temperature of acetone (235.5° C.), the high porosity of the poly(silicic acid) particles of the present invention is achieved (Examples 7 and 8). Wash liquid removal at sub-critical temperatures reduces costs and energy consumption significantly.

The products obtained herein, either with or without the acetone wash, exhibit a unique combination of high surface area and high-volume, high-diameter pores not exhibited by the siliceous particles of the art.

In certain cases wherein the water-soluble materials present are relatively volatile, it may be possible to eliminate the thawing and washing steps and, instead, "freeze-dry" the frozen acidified solution by sublimination at reduced pressure. Freeze-drying precludes the existence of the aforesaid capillary forces associated with liquid water. The freeze-dried particles so obtained can be heated at a temperature of about 105° to 300° C., preferably at reduced pressure, to remove the volatile, water-soluble compounds. The above procedure is especially advantageous when the water-soluble compounds are ammonium salts, such as $NH_4Cl$ or $(NH_4)_2CO_3$.

The porous, amorphous siliceous particles of this invention exhibit particle sizes in the range 10 to 100μ. The surface area and pore volumes of the particles can be measured by the well-known B.E.T. (Brunauer, Emmett and Teller) nitrogen adsorption technique. The B.E.T. method is satisfactory for pores having individual diameters of up to about 600 Å. However, still larger pores present in the preferred products of this invention are not "counted" by the B.E.T. method. Such pores, and the pore volumes they represent, may be measured by the known method of mercury intrusion porosimetry; see, for example, Winslow, J. Colloid and Interface Science, 67, No. 1, 42 (1978). In Example 16, both B.E.T. and mercury intrusion porosimetry methods are used to exemplify more accurately the total pore volume, average pore diameter and surface area which characterize the products of the invention.

The adsorptive capability of the particles of this invention can also be determined by measuring their equilibrium adsorption capacity (EAC) for carbon tetrachloride vapor; see, for example, Benesi et al., Anal. Chem. 27, 1963–5 (1955). Pore volumes can also be estimated from carbon tetrachloride adsorption data. Average pore diameters are calculated from B.E.T. surface area and pore volume data and from pore volume data obtained by mercury porosimetry, assuming cylindrical pores, using the formula Pore diameter (Å) = $10^4(4V/S)$ where v is the measured pore volume in cc (liquid) per gram (cc/g), and S is the surface area in square meters per gram (m$^2$/g) of particles. The aforesaid tests were employed to obtain data reported in the examples.

In the following examples of specific embodiments of this invention percentages are by weight.

EXAMPLE 1

A. An 1800 cc aqueous silicic acid solution (approximately 6.6 wt % SiO$_2$) was prepared as follows:

Commercially available aqueous sodium silicate (345 cc) was mixed with 1555 cc of distilled water. The commercial aqueous sodium silicate contained 28.4% SiO$_2$ and 8.7% Na$_2$O (wt ratio SiO$_2$/Na$_2$O of 3.25) and had a density at 15.6° C. of about 1.39 g/cc. This solution was then passed through an ion-exchange column (7.6 cm inside diameter, 61 cm length) packed with a sulfonated polystyrene copolymer in the hydrogen form ("Rexyn" 101H, R231 cation exchange resin). The effluent from the column had a pH of 2.5. The silicic acid solution was divided into six 300 cc portions and each was placed in a polyethylene dish. In each of these solutions (labeled A through F) was dissolved, respectively, the following amount of NH$_4$Cl: 2 g; 4 g; 8 g; 12 g; 16 g; and 20 g. These weights correspond to about 10, 20, 40, 60, 80 and 100% of the weight of SiO$_2$ in solution. A seventh silicic acid solution (G) containing 0% added salt was included as a control. The solutions were then adjusted to a pH of 5.0 using aqueous 1 N NH$_4$OH and allowed to age at room temperature for 2 hours after gelation. Each of the solutions gelled to a firm solid gel within 15–20 minutes. The aged gels were then frozen by floating the dishes on acetone at −55° C. for 2 hours, after which the dishes were removed and the gels were thawed. The poly(silicic acid) products were recovered by filtration, washed well with deionized water, and dried at 125° C. under reduced pressure. The weights of the products (A through F, respectively) obtained are as follows: 12.6 g; 15.7 g; 17.5 g; 18.6 g; 19.0 g; and 18.5 g. The equilibrium adsorption capacities of these products were determined by the following procedure:

1. Sample to be tested is placed in a tared vial with cap.
2. Sample is heated to 250°–300° C. for 1 hour, to activate and degas, cooled and weighed.
3. Vial containing sample (without cap) is placed in a closed container (jar) containing a reservoir of desired adsorbate.
4. Vial is removed, capped, and weighed.
5. Steps 3 and 4 are repeated daily until equilibrium weight is obtained.

Equilibrium adsorption capacity (EAC) is the weight gain divided by the sample weight, expressed as g adsorbed/g of adsorbent. EAC divided by adsorbate density yields the pore volume of the adsorbate accessible through pores equal to or larger than the molecular diameter of the adsorbate. The equilibrium adsorption capacities of the above products, using CCl$_4$ as the adsorbate, are shown below:

|   | EAC (g/g SiO$_2$) | Pore Volume (cc CCl$_4$/g SiO$_2$) |
|---|---|---|
| A | 0.588 | 0.371 |
| B | 0.674 | 0.425 |
| C | 0.923 | 0.582 |
| D | 1.096 | 0.691 |
| E | 1.401 | 0.874 |
| F | 1.423 | 0.884 |
| G | 0.491 | 0.309 |

B. Following the procedure of Part A, three samples of poly(silicic acid) particles were prepared from 600 cc aqueous silicic acid solutions (approximately 6.6 wt % SiO$_2$) in which the following amounts of NH$_4$Cl were dissolved: 0 g; 32 g (80% of SiO$_2$); and 40 g (100% of SiO$_2$). The products, identified A, B and C, respectively, had the surface areas and porosities, as measured by the B.E.T. procedure, shown below:

|   | NH$_4$Cl Added (% of SiO$_2$) | Surface Area (m$^2$/g) | Pore Volume (cc/g) | Pore Diameter (Å) |
|---|---|---|---|---|
| A | 0 | 794 | 0.452 | 22.8 |
| B | 80 | 620 | 1.177 | 76.0 |
| C | 100 | 599 | 1.594 | 106.5 |

The distributions of pore diameters for A, B and C, calculated from the B.E.T. data, are plotted in FIG. 1.

The EAC for CCl$_4$ for Sample C was determined to be 1.56. Samples of this product were heated for 1 hour in air at various temperatures, as noted in the table below. The EAC (CCl$_4$) and B.E.T. surface area of each heated sample were determined; the data shown in the following table reflect the excellent thermal stability of the products.

| Heat Treatment | EAC CCl$_4$ g CCl$_4$/g SiO$_2$ | Surface Area m$^2$/g |
|---|---|---|
| 1 hr. at 600° C. | 1.71 | 592 |
| 1 hr. at 700° C. | 1.68 | 595 |
| 1 hr. at 800° C. | 1.68 | 602 |
| 1 hr. at 900° C. | 1.60 | 560 |
| 1 hr. at 1000° C. | 1.63 | 574 |
| 1 hr. at 1100° C. | 1.54 | 537 |
| 72 hr. at 800° C. | 1.54 | 572 |

EXAMPLE 2

A 10 cc 1 M aqueous silicic acid solution of pH 3.3, prepared from an aqueous sodium silicate solution by ion-exchange, was divided into two 5 cc portions. To one was added 5 cc of 1 N aqueous NaCl (NaCl was 97.3% of the SiO$_2$); to the other was added 5 cc of 1 N KCl (KCl was 124% of the SiO$_2$). The gelled solutions were then frozen by cooling to $-78°$ C. for 10 minutes, after which they were held at $-20°$ C. for 1 hour. The poly(silicic acid) products were recovered as flakes after thawing of the gels, followed by the customary washing and drying.

EXAMPLE 3

Aqueous silicic acid solution (approximately 6.6 wt % SiO$_2$) was prepared as in Example 1. Each of five portions of this solution was treated as follows:

1. The modifier indicated in the table below was dissolved in 600 cc of the aqueous silicic acid solution in a plastic dish.
2. The pH of the solution was adjusted to 5.0 with dilute NH$_4$OH, unless the pH was above 5.0 after addition of the modifier, and the solution was aged 1½ to 2½ hours.
3. The aged gel was then frozen by floating on acetone at $-50°$ to $-54°$ C.
4. The frozen gel was thawed and the poly(silicic acid) product was filtered off, washed well with deionized water and dried at 125° C. under reduced pressure.

| Modifier | | Wt. Added (g) | pH | Gel Time (min) | Modifier (% SiO$_2$) | Wt. Product (g) |
|---|---|---|---|---|---|---|
| A | LiCl | 40 | 6.0 | <<0.5 | 100 | 37.2 |
| B | CH$_3$CO$_2$NH$_4$ | 40 | 6.3 | 1 | 100 | 35.8 |
| C | CaCl$_2$ | 40 | 5.0 | 3 | 100 | 38.4 |
| D | (NH$_4$)$_2$HPO$_4$ | 40 | 7.3 | <<0.5 | 100 | 37.2 |
| E | Ca(SCN)$_2$ . 4H$_2$O | 58.4 | 5.5 | 2.5 | 100 | 35.6 |

The equilibrium adsorption capacities for CCl$_4$ and the surface properties, as measured by the B.E.T. method, for the products are as follows:

| Modifier | | EAC (g CCl$_4$/g adsorbent) | Pore Volume (cc CCl$_4$/g) | Pore Volume (cc/g) |
|---|---|---|---|---|
| A | LiCl | 1.274 | .803 | .939 |
| B | CH$_3$CO$_2$NH$_4$ | 1.147 | .723 | .932 |
| C | CaCl$_2$ | 1.109 | .699 | .896 |
| D | (NH$_4$)$_2$HPO$_4$ | 1.715 | 1.081 | 1.272 |
| E | Ca(SCN)$_2$ . 4H$_2$O | 1.267 | .798 | 1.044 |

| Modifier | | Surface Area (m$^2$/g) | Pore Diameter (Å) |
|---|---|---|---|
| A | LiCl | 495 | 76 |
| B | CH$_3$CO$_2$NH$_4$ | 666 | 56 |
| C | CaCl$_2$ | 675 | 53 |
| D | (NH$_4$)$_2$HPO$_4$ | 540 | 94 |
| E | Ca(SCN)$_2$ . 4H$_2$O | 563 | 74 |

EXAMPLE 4

An aqueous Na$_2$SO$_4$ solution was prepared by dissolving, with stirring, 12 g of Na$_2$SO$_4$ in 450 cc of deionized water in a polyethylene dish. To this solution, well stirred, were added simultaneously, in less than 1 minute, two separate streams consisting of, respectively, the commercially available aqueous sodium silicate described in Example 1 and 30 cc of 12 N H$_2$SO$_4$. The relative rates were such as to maintain the pH of the stirred solution between 2.5 and 3.0. After the addition, sufficient additional aqueous sodium silicate was added to adjust the pH to 5.6, at which time the solution contained a total of 105 cc of the aqueous sodium silicate. The solution gelled in approximately 1 minute; the gel was aged for 2 hours and then frozen in the plastic dish at $-25°$ to $-22°$ C. The gel then was thawed and the product was filtered off, washed well with deionized water and dried at 125° C. under reduced pressure. The product weighed 38.2 g (a white powder) and approximately corresponded to a 6.6 wt % SiO$_2$ solution containing 100% of Na$_2$SO$_4$ (29.4 g from the neutralization plus 12 g added), based on the weight of SiO$_2$ present. Measurement of surface properties by the B.E.T. method showed the poly(silicic) product to have a surface area of 672 m$^2$/g, a pore volume of 0.97 cc/g, and a pore diameter of 58 Å. This product exhibited an EAC (CCl$_4$) of 1.60 g/g adsorbent, corresponding to a pore volume (CCl$_4$) of 1.01 cc/g.

EXAMPLE 5

Aqueous silicic acid solution (approximately 6.6 wt % SiO$_2$) was prepared as in Example 1. To 600 cc of this solution in a polyethylene dish were added, with stirring, 28 g of Na$_2$SO$_4$ (approximately 70% of the weight of SiO$_2$ in solution); stirring was continued until a clear solution was obtained. The pH of the resultant solution was then adjusted to 6.2 as rapidly as possible by the addition of 1 N aqueous NaOH solution to the well stirred solution. The solution gelled rapidly (2.5 seconds); the gel was aged 15 minutes at room temperature and was particulated to approximately 3.175 mm particles directly into a stirred fluorocarbon bath at $-25°$ to $-30°$ C. The gel was frozen in the bath for ½ hour, after which it was thawed in H$_2$O. The product was recovered by filtration, washed SO$_4$= free with deionized water, given two successive washes with 0.8 N HNO$_3$ and again washed with deionized water. The poly(silicic) product was found to contain 3.7 ppm of Na by analysis and had a surface area of 937 m$^2$/g, a pore volume of 1.84 cc/g and a pore diameter of 78 Å as determined by the B.E.T. procedure.

EXAMPLE 6

A. Using a multiple-jet mixing nozzle similar to those described by A. Weissberger in "Techniques of Organic Chemistry", Vol. VIII, Part II, page 709, Interscience Publishers, 1963, 178 cc/min of aqueous sodium silicate solution (prepared by mixing 5 parts by vol of the commercially available aqueous sodium silicate described in Example 1 with 1 part by vol of deionized water) and 392 cc/min of 1.8 N H$_2$SO$_4$ were mixed continuously for 6 minutes to prepare a silicic acid solution having a pH of 6.5 and containing about 10.5 wt % SiO$_2$ and 70 g of Na$_2$SO$_4$/100 g of SiO$_2$ in solution. This solution was collected sequentially in plastic dishes, allowed to gel, and aged 5 minutes. The gel was particulated to approximately 3.175 mm particles, by passing the gel through a mechanical chopper, and dropped directly from the particulator into a stirred bath of fluorocarbon solvent, at approximately $-25°$ to $-35°$ C., at such a rate that the product entered the freezing bath within 5 to 6 minutes of its preparation in the mixer. The frozen gel was removed from the freezing bath after 2 hours and thawed in water. The resultant slurry was allowed to settle and the supernatant liquid was decanted off. The thick product slurry was washed in a twenty-plate column, such as described in U.S. Pat. No. 3,881,876, by passing 0.8 N HNO$_3$ into the column at 250 cc/hr five plates from the product exit while deionized water was passed into the column at the discharge plate at 375 cc/hr. A sample of product slurry was filtered and dried at 125° C. under reduced pressure. The poly(silicic acid) product on analysis was found to contain less than 3.5 ppm Na, and exhibited an EAC for $CCl_4$ of 2.13, corresponding to a pore volume ($CCl_4$) of 1.34 cc/g, a surface area of 809 m$^2$/g, a pore volume ($N_2$) of 2.01 cc/g and an average pore diameter of 99 Å as determined by the B.E.T. procedure.

B. The following data illustrate the good thermal stability of the product of this example.

| Sample | Surface Area (m$^2$/g) | Pore Volume (cc/g) |
| --- | --- | --- |
| As Prepared | 809 | 2.01 |
| After heating for 4 hr at 800° C. | 751 | 1.52 |
| After heating for 1 hr at 1000° C. | 642 | 1.57 |

C. A portion of the silicic acid solution prepared in Part A was sprayed directly from the mixing nozzle into a stirred bath of fluorocarbon solvent at −25° C. without previously being allowed to gel and/or age. The silicic acid solution agglomerated into 0.6 to 1.9 cm balls. These balls were frozen in the bath for 2 hours, removed, thawed in water, filtered and washed $SO_4^=$ free with deionized water. The filter cake was slurried in 0.8 N $HNO_3$ for 15 minutes, filtered, re-slurried in 0.8 N $HNO_3$, filtered, washed with deionized water and dried at 125° C. under reduced pressure. The poly(silicic acid) product was found to contain 11 ppm Na and exhibited a surface area of 793 m$^2$/g, a pore volumn ($N_2$) of 0.96 cc/g and an average pore diameter of 48 A as determined by the B.E.T. procedure.

EXAMPLE 7

Following the procedure of Example 6, 192 cc/min of aqueous sodium silicate solution (prepared by mixing 5 parts by vol of the commercially available aqueous sodium silicate described in Example 1 with 1 part of deionized water) was mixed with 382 cc/min of 1.8 N $H_2SO_4$ to prepare a silicic acid solution having a pH of 6.4–6.5. The solution was collected sequentially in plastic dishes. The gel (gel time 1–2 seconds) was aged at room temperature for 15 minutes, particulated to approximately 3.175 mm particles in the sequential order of preparation directly into a stirred fluorocarbon bath at −15° to −25° C. and stirred in the bath for ½ hour. The frozen gel was removed from the bath, then thawed in water; the resultant slurry was passed through a twenty-plate washing column with approximately 300 cc/hr of deionized water being passed upward in the column from the discharge plate and 150 cc/hr of 0.2 N $HNO_3$ being injected into the column five plates from the exit. A sample of the product, designated A, was dried under reduced pressure at 125° C.

A second sample of the product, designated B, was washed with commercial acetone, then with acetone which had been dried over a molecular sieve and, finally, it was dried at 125° C. under reduced pressure. The poly(silicic acid) products A and B on analysis were found to contain 63 ppm of Na and exhibited an EAC for $CCl_4$ and surface properties, measured by the B.E.T. procedure, as follows:

| Sample | EAC (g $CCl_4$/g $SiO_2$) | Surface Area (m$^2$/g) | Pore Diameter (Å) | Pore Volume (cc/g) |
| --- | --- | --- | --- | --- |
| A | 1.744 | 966 | 53 | 1.28 |
| B | 3.860 | 988 | 174 | 4.30 |

EXAMPLE 8

Following the procedure of Example 7, an acetone-washed poly(silicic acid) product was prepared having the following surface properties as measured by the B.E.T. procedure: surface area, 939 m$^2$/g; pore volume, 4.33 cc/g; average pore diameter, 184 Å. A part of this product (50 g) was mixed well with 2 g (4 wt %) of polyethylene powder. The blended powders were then compression molded into granules by molding into wafers; the wafers were crushed and screened to obtain particles 10 and 20 mesh (U.S. Sieve Series) in size. The surface properties of these granules as measured by the B.E.T. procedure were: surface area, 804 m$^2$/g; pore volume, 1.80 cc/g; average pore diameter, 89 Å.

EXAMPLE 9

The procedure of Example 7 was repeated using 192 cc/min of a 5:1 (by vol) mixture of the commercially available aqueous sodium silicate and deionized water and 388 cc/min of approximately 1.8 N $H_2SO_4$ to produce an aqueous silicic acid solution having a pH of 6.1. The gel which formed was aged, particulated, frozen and then thawed; the resultant slurry was passed through a twenty plate column as in Example 7. A sample of the product, designated A, was dried at 125° C. under reduced pressure. A second sample of the product, designated B, was washed well with commercial acetone, then with acetone dried over a molecular sieve; finally, it was dried at 125° C. under reduced pressure. The surface properties of the poly(silicic acid) products, as measured by the B.E.T. procedure, were as follows:

| | Surface Area (m$^2$/g) | Pore Diameter (Å) | Pore Volume (cc/g) |
| --- | --- | --- | --- |
| A | 757 | 112 | 2.12 |
| B | 773 | 198 | 3.82 |

Sample B was heated for 1 hr at either 800° or 1000° C. The small change in B.E.T. surface area at either temperature demonstrates the good thermal stability of even the very large pore freeze-formed silicas of this invention.

| Sample | Surface Area (m$^2$/g) | Pore Volume (cc/g) |
| --- | --- | --- |
| As prepared | 773 | 3.82 |
| 1 hr at 800° C. | 716 | 3.28 |
| 1 hr at 1000° C. | 591 | 2.60 |

EXAMPLE 10

Using a multiple-jet mixing nozzle, 167 cc/min of aqueous sodium silicate solution (prepared as in Example 9) was mixed with 335 cc/min of 1.8 N $HNO_3$ to produce approximately 4.5 liters of aqueous silicic acid solution having a pH of 6.5, containing approximately 84%, by weight, of NaNO$_3$, based on the weight of SiO$_2$, and having a gel time of 1–2 seconds. The gel was aged 1 hr, particulated to approximately 3.175 mm particles and frozen in a stirred fluorocarbon bath at −15° to −25° C. for 2 hours. The frozen gel was removed from the cold bath and thawed in water; the particles were filtered off, washed well with deionized water, slurried (carried out two times) with approximately 2 liters of 0.8 N HNO$_3$, washed again with water and dried at 125° C. under reduced pressure. The dried poly(silicic acid) product weighed 439 g, contained 11 ppm of Na, and exhibited a surface area of 664 m$^2$/g, a pore volume of 1.147 cc/g and a pore diameter of 69 Å, as determined by B.E.T. procedure. Pore diameter distribution of this product was such that 80% of the pore volume was contributed by pores having a diameter of 45–100 Å; there were few, if any, pores having a diameter of less than 25 Å.

EXAMPLE 11

The procedure of Example 10 was repeated using approximately 285 cc/min of sodium silicate solution, prepared as in Example 9, and approximately 305 cc/min of 3.2 N H$_2$SO$_4$; the resultant silicic acid solution had a pH of 5.5 to 5.8. The resultant gel was particulated, frozen and thawed and the recovered particles were washed, all as in Example 10. The dried product exhibited the following surface properties as measured by the B.E.T. procedure: surface area, 900 m$^2$/g; pore volume, 1.49 cc/g; pore diameter, 66 Å. Part of this product was processed using a Stokes Tablet Press to prepare 0.5 cm diameter pellets which exhibited the following surface properties as measured by the B.E.T. procedure: surface area, 728 m$^2$/g; pore volume, 0.93 cc/g; pore diameter, 51 Å. After heating for 1 hr at 600° C. these pellets showed the following surface properties: surface area, 763 m$^2$/g; pore volume, 1.06 cc/g; pore diameter, 56 Å.

EXAMPLE 12

The procedure of Example 6 was repeated using 186 cc/min of aqueous sodium silicate solution (prepared as in Example 9) and 394 cc/min of approximately 1.8 N acetic acid to produce an aqueous silicic acid solution having a pH of 6.5 and containing about 94% of sodium acetate, based on the weight of SiO$_2$ present. The solution gelled in 1–2 seconds; the gel was aged, particulated, frozen and thawed; the resultant slurry was passed through a twenty plate column as in Example 6A. The poly(silicic acid) product was dried at 125° C. under reduced pressure and on analysis was found to contain 18 ppm of Na. The product exhibited a surface area of 919 m$^2$/g, a pore volume of 1.29 cc/g and a pore diameter of 56 Å, as determined by the B.E.T. procedure.

EXAMPLE 13

A. To 1 liter of an aqueous silicic acid solution (6 wt. % SiO$_2$; 60 g of SiO$_2$) of pH 5.4, prepared as in Example 1 and contained in a cylinder, was added 6 g (10% of the SiO$_2$) of sucrose. The solution gelled in 20 minutes; the gel was frozen at −63° C. at a rate of 1.9 cm/hr and then thawed; the recovered product was washed and dried at 240° C. The poly(silicic acid) product was fibrous and exhibited, by B.E.T. measurements, a surface area of 976 m$^2$/g, a pore volume of 0.98 cc/g and a pore diameter of 40 Å.

B. To four 100 cc portions of an aqueous silicic acid solution (6 wt % SiO$_2$; 6.0 g of SiO$_2$ per 100 cc) of pH 5.0 were added, respectively, 0.0 g, 0.6 g, 1.2 g and 3.0 g of sucrose (corresponding to respectively, 0%, 10%, 20% and 50% of the SiO$_2$). Each mixture was frozen at −63° C. before gel formation occurred. The products were recovered as above as flakes which remained white on drying at 240° C. The products, numbered 1 to 4, exhibited the following characteristics as measured by the B.E.T. procedure:

| Sample | Surface Area (m$^2$/g) | Pore Volume (cc/g) | Pore Diameter (Å) |
|---|---|---|---|
| 1 | 676 | 0.33 | 19 |
| 2 | 833 | 0.54 | 26 |
| 3 | 905 | 0.51 | 23 |
| 4 | 898 | 0.90 | 40 |

EXAMPLE 14

A 6.6 wt % SiO$_2$ aqueous silicic acid solution was prepared as in Example 1. Portions (600 cc each) of this solution were placed in two plastic dishes. In one of these portions, designated A, was dissolved 4 g (approximately 10% of the weight of SiO$_2$) of sorbitol. In the second portion, designated B, was dissolved 8 g (20% of the SiO$_2$) of sorbitol. The pH of the portions was adjusted to 5.0 with 0.1 N NH$_4$OH; the gels (gel time about 20 min) were aged for 4 hours at room temperature and then frozen by floating the dishes in a cold bath at −50° C. The frozen gels were then thawed and the particles were filtered off, washed well with deionized water and dried at 125° C. under reduced pressure. The poly(silicic acid) products from these two preparations had the following properties, respectively: surface areas of 808 and 803 m$^2$/g; pore volumes of 0.57 and 0.96 cc/g; and pore diameters of 28 and 48 Å, using the B.E.T. method of determination.

EXAMPLE 15

Freshly prepared silicic acid solution (approximately 6.6% SiO$_2$) was prepared as in Example 1. Portions of this solution were added slowly with good stirring to portions of the solution of commercial aqueous sodium silicate described in Example 1. The amounts and the resultant sodium silicate solutions were as follows:

| | 6.6% Silicic Acid | Commercial Sodium Silicate Solution | Product Solution |
|---|---|---|---|
| A. | 888 cc | 100 g | 10:1 SiO$_2$/Na$_2$O (~8.8% SiO$_2$) |
| B. | 624 cc | 100 g | 8:1 SiO$_2$/Na$_2$O (~9.6% SiO$_2$) |
| C. | 300 cc | 83 g | 6:1 SiO$_2$/Na$_2$O (~11.3% SiO$_2$) |

The procedure of Example 4 was repeated with each of these solutions using 100 cc of deionized water in the polyethylene dish and simultaneously adding the above solution and 6 N H$_2$SO$_4$ to prepare silicic acid solutions which were aged 15 minutes, particulated to 0.3 cm particles and frozen in a stirred fluorocarbon bath at −25° to −30° C. for 30 minutes. The frozen particles were then thawed in water, washed SO$_4$= free with deionized water, given two successive washes with 0.8 N HNO$_3$ and again washed with deionized water. Samples of each product were dried at 125° C. under reduced pressure. Samples of each product were also washed well with acetone, as described in Example 9, and dried at 125° C. under reduced pressure. The properties of these products, as measured by the B.E.T. method, were as follows:

A. 10:1 SiO$_2$/Na$_2$O Solution
Silicic Acid Solution pH 6.4

|  | Surface Area (m$^2$/g) | Pore Volume (cc/g) | Pore Diameter (Å) |
|---|---|---|---|
| Water Washed | 962 | 1.54 | 64 |
| Water, then Acetone Washed | 988 | 1.61 | 65 |

B. 8:1 SiO$_2$/Na$_2$O Solution,
Silicic Acid Solution, pH 6.4–6.5

|  | Surface Area (m$^2$/g) | Pore Volume (cc/g) | Pore Diameter (Å) |
|---|---|---|---|
| Water Washed | 887 | 1.60 | 72 |
| Water then Acetone Washed | 862 | 1.94 | 90 |

C. 6:1 SiO$_2$/Na$_2$O Solution
Silicic Acid Solution, pH 6.7

|  | Surface Area (m$^2$/g) | Pore Volume (cc/g) | Pore Diameter (Å) |
|---|---|---|---|
| Water Washed | 779 | 2.03 | 104 |
| Water, then Acetone Washed | 842 | 2.56 | 122 |

EXAMPLE 16

Following the procedure of Example 7, the sodium silicate and 1.8 N H$_2$SO$_4$ solutions were mixed to prepare a silicic acid solution of pH 6.3. This solution was processed as in said example to produce a product, designated A, which was dried at 125° C. under reduced pressure. A second portion of the product, designated B, was washed with acetone as in Example 7 and dried at 125° C. under reduced pressure. The products on analysis were found to contain 13 ppm Na and exhibited the following surface properties as measured by the B.E.T. procedure:

| Sample | Surface Area (m$^2$/g) | Pore Volume (cc/g) | Pore Diameter (Å) |
|---|---|---|---|
| A | 928 | 1.20 | 52 |
| B | 939 | 4.33 | 184 |

Pore size was also measured on B by mercury intrusion porosimetry (Winslow, J. Colloid and Interface Science, 67, No. 1, 42 (1978). This determination showed that B exhibited a pore volume of 3.89 cc/g in pores with diameters greater than 600 Å. The pore volume measurement by the B.E.T. procedure determined a pore volume of 4.33 cc/g for B in pores of 600 Å diameter and smaller. Following the procedure of Winslow, the total pore volume of B is 3.89±4.33 = 8.22 cc/g.

BEST MODE FOR CARRYING OUT THE INVENTION

The best mode for carrying out this invention is described by Examples 6A, 7, 8 and 11.

INDUSTRIAL APPLICABILITY

The industrial applicability of the process of this invention is demonstrated by all the examples herein. The industrial applicability of the product of this invention is demonstrated by the adsorptivities and characterization data reported in Examples 1 and 3 to 16.

We claim:
1. Particulate, porous, water-insoluble hydrophilic, thermally stable, amorphous poly(silicic acid) which is of the empirical formula [Si$_3$O$_5$(OH)$_2$]·(H$_2$O)$_n$ wherein n is a fractional or whole number within the range about 0 to 6 and which is characterized by an average pore diameter of 60 Å to about 300 Å and a surface area of greater than 850 m$^2$/g.

2. Poly(silicic acid) of claim 1 which is substantially free of alkali metal ions.

3. Poly(silicic acid) of claim 1 which has been compacted into granules or pellets.

4. Poly(silicic) acid of claim 1 which has been subdivided so as to have a particle size of about 1 to 10μ.

5. Particulate, porous, water-insoluble, amorphous poly(silicic acid) which is of the empirical formula [Si$_3$O$_5$(OH)$_2$]·(H$_2$O)$_n$ wherein n is a fractional or whole number within the range about 0 to 6 and which is characterized by a pore volume of 1.8 ml/g to about 8.5 ml/g and a surface area of greater than 850 m$^2$/g.

6. Poly(silicic acid) of claim 4 wherein the pore volume is 2.0 ml/g to about 8.5 ml/g.

7. Process for preparing particulate, porous, water-insoluble, hydrophilic, thermally stable, amorphous poly(silicic acid) by acidifying an appropriate aqueous silicate solution, allowing the silicic acid thus formed to polymerize to poly(silicic acid), freezing the acidified solution, and thereafter thawing the acidified solution and isolating therefrom, washing, drying and recovering particulate poly(silicic acid), said process further characterized in that:
(a) the amount of silicate in the aqueous silicate solution is such that the SiO$_2$ content of the acidified solution is about 4 to 25 weight % and such that the acidified solution contains about 15 to 150 weight %, based on the weight of SiO$_2$, of at least one water-soluble compound which is precipitable from the acidified solution at −10° to −200° C. and which is inert to the silicate, silicic acid and poly(silicic acid);
(b) the aqueous silicate solution is acidified to a pH of about 3 to 9;
(c) the acidified solution is cooled to a temperature of about −10° to −200° C. until it is frozen to separate substantially all of the chemically unbound water as substantially pure ice and to precipitate water soluble compound within the pores of the poly(sililic acid) particles being formed; said acidified solution being in gelled form prior to cooling.

8. Process of claim 7 wherein the gel is aged and granulated before the acidified solution is cooled to −10° to −200° C.

9. Process of claim 8 wherein the gel is aged 5 to 30 minutes; in (a), the weight % of water-soluble compound is 20 to 120; in (b), the pH is 4 to 7; and, in (c), the temperature is about −15° to −80° C.

10. Process of claim 7 wherein the silicate is an alkali metal silicate.

11. Process of claim 10 wherein the silicate is sodium silicate.

12. Process of claim 7 wherein the water-soluble compound is a salt of an alkali or alkaline earth metal, ammonium or quaternary ammonium cation and a mineral acid anion.

13. Process of claim 12 wherein the mineral acid is sulfuric, hydrochloric or nitric acid.

14. Process of claim 16 wherein the compound is sodium sulfate.

15. Process of claim 7 wherein the washing of particulate product includes use of an aqueous ammonium salt solution.

16. Process of claim 7 wherein the washing of particulate product is by countercurrent washing.

17. Process of claim 10 wherein the acidification of the aqueous silicate solution takes place in a mixing nozzle.

* * * * *